United States Patent [19]

Powell

[11] 4,243,301
[45] Jan. 6, 1981

[54] ELASTICALLY DEFORMED REFLECTORS

[76] Inventor: Roger A. Powell, 1589 Vernon Rd., Norristown, Pa. 19401

[21] Appl. No.: 28,124

[22] Filed: Apr. 9, 1979

[51] Int. Cl.³ .......................... G02B 7/18; G02B 5/10
[52] U.S. Cl. ................................. 350/296; 29/522 R; 29/449
[58] Field of Search ............... 350/296, 295, 293, 310, 350/320, 288; 248/475 R; 29/448, 449, 522, 446

[56] References Cited

U.S. PATENT DOCUMENTS

| 622,480 | 4/1899 | Ives | 350/295 |
|---|---|---|---|
| 1,698,905 | 1/1929 | Beechlyn | 350/293 |
| 4,059,346 | 11/1977 | Levine et al. | 350/295 |
| 4,135,493 | 1/1979 | Kennedy | 350/296 |
| 4,139,270 | 2/1979 | Dotson | 350/296 |

FOREIGN PATENT DOCUMENTS

| 410768 | 3/1925 | Fed. Rep. of Germany | 350/293 |
|---|---|---|---|
| 501072 | 6/1930 | Fed. Rep. of Germany | 350/310 |
| 485390 | 5/1938 | United Kingdom | 350/293 |

Primary Examiner—Jon W. Henry
Attorney, Agent, or Firm—Warren W. Kurz

[57] ABSTRACT

Spherically-shaped dish and cylindrically-shaped trough reflectors are produced by the deflection of a thin reflective element within its elastic range of stress. A spherical or cylindrical shape is produced by including a pure bending moment stress pattern in the reflective element. This is accomplished by clamping the edges of the reflective element to a rigid frame which is precisely dimensioned relative to the dimensions of the reflective element. Preferably, the surface of the frame which engages and supports the reflective element is tangent to the desired radius of curvature of the reflector. Close control of the dimensions insures that no compressive or tensile stresses are induced in the element by forces from the support surfaces, such forces tending to push the edges of the reflective element toward or away from each other.

5 Claims, 10 Drawing Figures

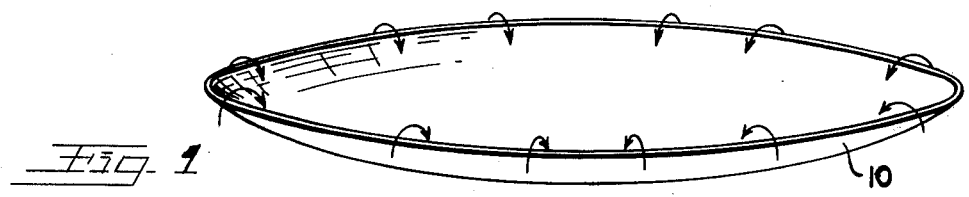
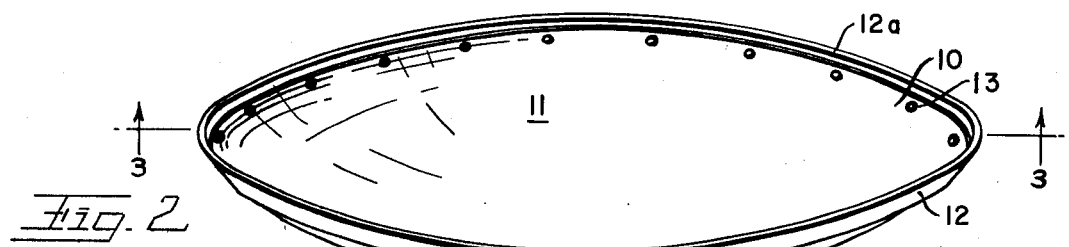
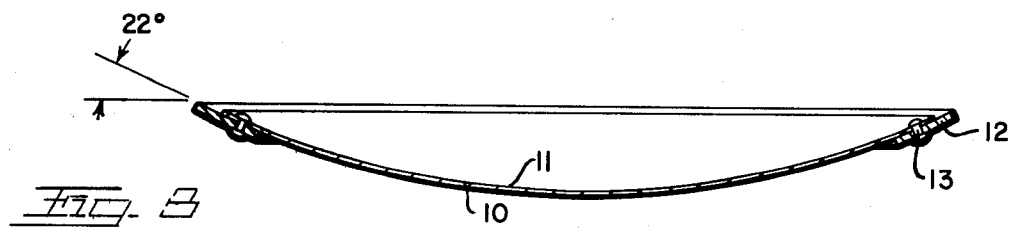
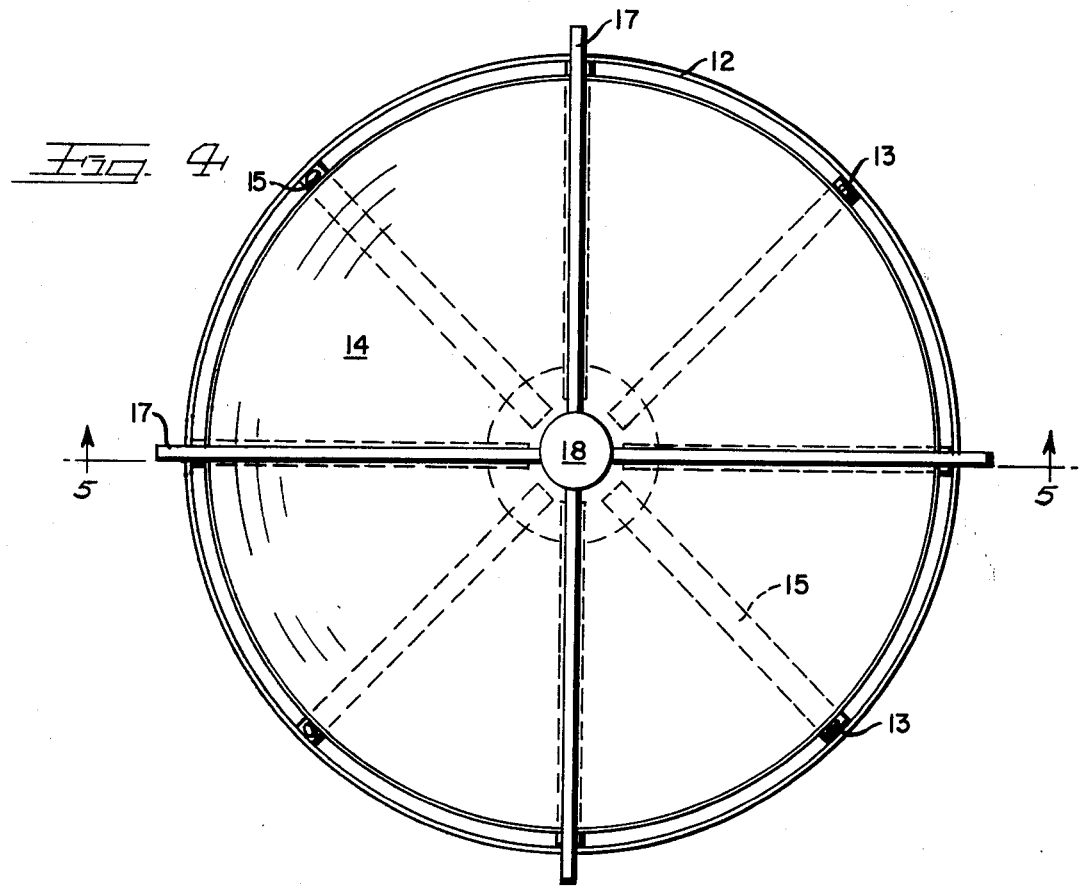

ELASTICALLY DEFORMED REFLECTORS

BACKGROUND OF THE INVENTION

The present invention relates to solar energy conversion apparatus and, more particularly, to improvements in solar energy collectors of the dish and trough reflector variety. Further, this invention relates to improvements in methods for producing both dish and trough types of reflectors.

Considerable time and effort is presently being expended in determining the feasibility of utilizing the sun's energy as a means for supplying the heating and power needs of home and industry. While there is little question that the know-how exists for converting solar energy into vast quantities of heat and electrical energy, the principle stumbling block confronting widespread commercial use of the sun's rays for such purposes is one of economics. Because of the high costs associated with the manufacture of efficient solar energy converters of a practical size, the economics still favor the use of conventional fossil fuels.

A major factor contributing to the relatively high cost of solar energy converters is the cost associated with the manufacture of the collector component, i.e. the reflector or lens which acts to collect and focus solar rays to form a region of intense heat. To produce significant quantities of heat or electrical energy from solar energy, collectors of substantial size are required. To satisfy the requirement, large dish and trough-shaped reflectors have been proposed and, in some instances, are being utilized as the collector element. While such reflectors are substantially less expensive than refractive elements of comparable light-gathering power, their manufacturing costs are, for the size required, still at a level which renders large-scale energy production economically non-feasible. To date, dish and trough reflectors have been conceived and/or made of glass, space-frame structures and segmented sheets, or molded composite plastic materials. See, for instance, the trough reflector disclosed in U.S. Pat. No. 3,841,738 to Caplan. Such conventional reflectors are not only difficult to fabricate, but also they require the use of relatively expensive materials. As a consequence, few, if any, are economically attractive.

In my U.S. Pat. No. 4,119,365, I disclose a trough reflector which, compared to previously devised structures, is considerably simpler in construction and, hence, less costly to fabricate. This trough reflector comprises a relatively flexible planar reflector supported between a pair of spaced parallel arms. The support arms are rotatably mounted on a frame, and one arm is free to slide toward and away from the other to assure that the ultimate shape of the reflector is not influenced by end loads. Rotation of the support arms in opposite directions produces a pure bending moment in the reflector, the result being that the reflector assumes a concave shape represented by a sector of a right cylinder. Such a surface has relatively good focusing properties and can be modified relatively easily toward the optimum parabolic cross-section by selectively adding small end loads to the reflector.

While the trough reflector disclosed in my U.S. Pat. No. 4,119,365 is, compared to prior art reflectors, relatively inexpensive to manufacture, it does include certain structural elements which act to produce the requisite pure bending moment in the reflector. Preferably, such structure comprises two pairs of ball bearing assemblies for rotatably supporting the support arms, a mechanical linkage by which equal and opposite torques can be applied to the support arms to produce the requisite bending moments in the reflector, and longitudinal beams to maintain structural integrity. Such components, of course, add signficantly to the overall manufacturing costs of the trough reflector and should, if possible, be eliminated.

SUMMARY OF THE INVENTION

In view of the foregoing, the primary objective of the present invention is to minimize the manufacturing costs of reflectors of the type having the focusing qualities, size and construction required for solar energy conversion work.

Another objective of the invention is to provide a high quality solar energy collector which can be readily snapped together from a plurality of inexpensive, lightweight parts.

This objective is achieved by the provision of a trough reflector comprising a flexible planar member having a reflective surface, and means for supporting the reflective member, upon being flexed in a predetermined manner, at certain locations along its periphery. The planar member is preferably either circular or rectangular in shape, having dimensions adapted to respectively produce either a spherical or cylindrical section of a desired radius of curvature upon having a pure bending moment uniformly applied thereto within the elastic limits of the planar member. The support for the planar member is mounted on a frame in such a manner as to engage the edges of the planar member after such member has been flexed (e.g. manually) to produce a substantially spherical or cylindrical sector shape, and to exert a pure bending moment thereon so as to prevent the planar member from relaxing to its planar state.

The details of my invention and its advantages over the aforementioned prior art devices will be better understood from the ensuing detailed description, reference being made to the accompanying drawings in which like reference numerals denote like parts.

BRIEF DESCRIPTION OF THE DRAWINGS

FIG. 1 is a perspective view of a dish reflector illustrating the concept of the invention;

FIG. 2 is a perspective view of a dish reflector structured in accordance with a preferred embodiment of the invention;

FIG. 3 is a cross-sectional view of the FIG. 2 reflector taken along the section line 3—3;

FIG. 4 is a perspective view of a dish reflector structured according to an alternative embodiment;

DETAILED DESCRIPTION OF PREFERRED EMBODIMENTS

Figure 5:
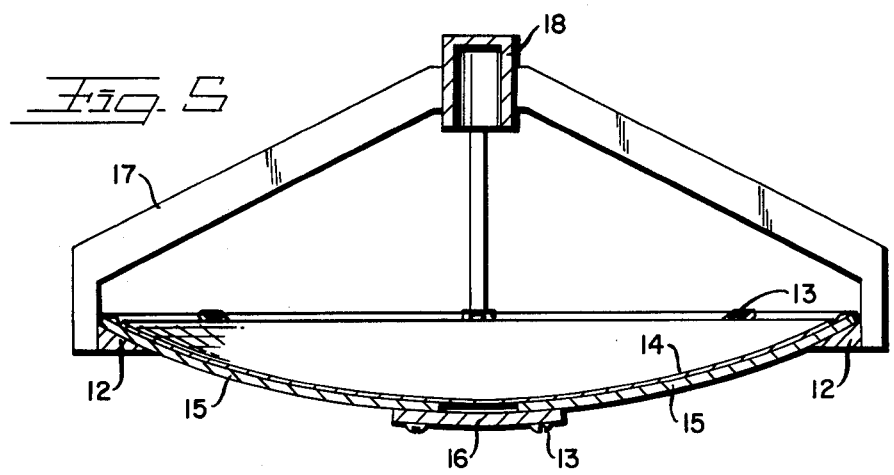
FIG. 5 is a cross-sectional view of the reflector depicted in FIG. 4 taken along the section line 5—5.

Referring now to the drawings, the inventive concept, as applied to the manufacture of a dish-shaped reflector, is shown in FIG. 1. It is well known from beam theory that the shape that a beam in flexure will assume can be accurately predicted from the beam's physical properties and the external forces and moments that are applied to it. For example, it is known that a beam of uniform stiffness to which a "pure" bending moment is applied will assume a circular shape having a radius of curvature determined by the beam length and the applied moments. This assumes, of course, that the elastic limit of the beam material is not exceeded. When the bending moments are removed, the beam will relax to its original rectilinear configuration. A "pure" bending moment is one which is free of end loads; that is, free of forces which would tend to force the ends of the beam toward or away from each other. This beam theory has been found to be directly applicable in constructing the dish and trough reflectors of the present invention.

In FIG. 1 there is shown a flexible circularly-shaped planar member 10 to which pure bending moments, indicated by the arrows, have been applied. As a result of such moments, the planar member assumes a spherical configuration. By polishing the concave surface 11 of the flexed planar member, a dish-shaped reflector is produced. The radius of curvature of the dish is determined by the magnitude of the twisting moments and the diameter and stiffness of the material of the planar member. To achieve the desired spherical shape, it is essential that the internal stresses in the planar member result only from the application of bending moments; otherwise, the resulting shape will exhibit poor, and essentially useless, focusing properties.

Knowing the physical properties of planar member 10, one can accurately calculate the maximum radius of curvature of a dish reflector fabricated by the above-described technique. Upon deciding on a desired radius of curvature and dish diameter, one can fabricate a rigid frame for maintaining the planar member in its flexed, dish-shape configuration after the twisting moments which initially produced such configuration have been removed. Such a frame 12 is shown in FIG. 2 and merely comprises an annular ring (e.g. a truncated cone) having an inclined inner surface 12a which, at all points at which it engages the flexed planar member, is tangent to its spherical shape. Frame 12 is preferably made of metal; in any case it must be sufficiently rigid to resist the reacting bending moments applied to member 10. Frame 12 can be permanently bonded to member 10 by a suitable adhesive, or as is preferred, it can be detachably connected to member 10 by a plurality of equally spaced fasteners 13 which pass through aligned apertures formed in the member 10 and the frame.

To fabricate the dish reflector shown in FIG. 2 the unflexed planar member 10 (which has a reflective surface and a circular shape) is positioned above the circular frame 12 so as to be concentric therewith. Obviously, the diameter of frame 12 is smaller than that of member 10. Both member 10 and frame 12 have equally spaced apertures formed near their respective peripheries, such apertures being precisely positioned so that the apertures of member 10 become aligned with the apertures of frame 12 when pure bending moments are applied to member 10. Then, an external force is applied to the central region of member 10 to cause it to flex downwardly, through the circular frame until the respective apertures of member 10 and frame 12 become aligned. Fasteners 13 are then fitted into the aligned apertures and tightened. At this point the external force can be removed. A cross-sectional view of the dish reflector shown in FIG. 2 is shown in FIG. 3. A typical inclination of the inner surface of the annular frame 12 with respect to the horizontal is 20°.

Preferably, planar member 10 comprises a thin, flexible, circular sheet of aluminum or of an aluminum alloy, one surface of the sheet being polished to a specular finish. For a dish reflector having a diameter of, say, 24 inches, and a radius of curvature of, say, 2.5 feet, the planar member thickness should be approximately 0.030 inches. The thickness of the reflector material cannot be excessive or its elastic limit may be exceeded during the fabrication process described above. It is important for the specific material to have sufficient flexural strength and elongation for the design conditions.

Figure 6:
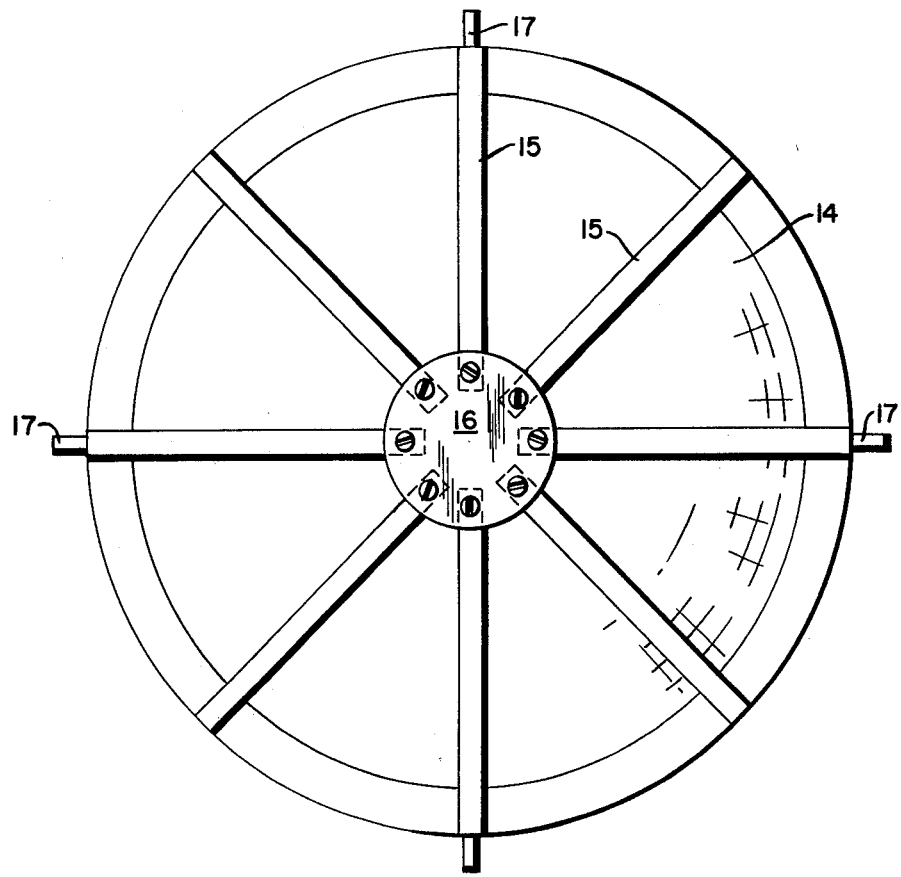
FIG. 6 is a bottom view of the FIG. 4 reflector.

FIGS. 4 through 6 show an alternate form of the dish reflector of the invention in combination with a solar energy receiver 18, such as a thermal fluid boiler. Receiver 18 is supported by struts 17 which are rigidly connected to frame 12. In this embodiment, reflective member 10 is in the form of a thin reflective skin 14 which is supported by a substructure comprising a plurality of narrow strips 15, best shown in FIGS. 5 and 6. Preferably, the reflective skin is adhesively bonded to the strips; it may, however, be connected by mechanical features. Strips 15 are fabricated from a flexible sheet metal, such as one-eighth inch thick aluminum; the strips are preferably between 1" and 3" wide. One end of each strip is connected to frame 12 by fasteners 13; the other end is connected to a center plate 16 by other fasteners. The reflective skin 14, may comprise, for instance, a 20 mil thick sheet of polished aluminum. The reflective skin and strips are rigidly fixed to one another so that the maximum stiffness is achieved since a principle purpose of the strips is to increase the reflector's resistance to gravity-induced sag and wind-induced deflections. The strips, skin and center plate assembly are flat prior to being attached to the annular support 12. As in the FIG. 2 embodiment, assembly of the reflector of FIG. 4 is effected by positioning the strip, skin and center plate assembly over the annular frame and deflecting the center plate downwardly, through the frame until apertures formed in the free ends of strips 15 are aligned with apertures formed in frame 12. After fasteners 13 are inserted and tightened the initial deflecting force can be removed. Of course, the strips are precisely dimensioned and the apertures in the strips and frames are precisely positioned so that, after the initial deflecting force is removed, only pure bending moments applied to strips 15 determine the shape of the reflector.

For solar energy conversion work, the ideal cross-sectional shape of the dish reflector should be parabolic, although the circular cross-section of a spherical reflector suffices for most uses. To achieve a parabolic cross-section, the apertures in frame 12 can be replaced with slots, and calibrated end loads can be applied to the reflective member to alter its spherical shape toward that of a paraboloid. Alternatively, the location of the holes for fasteners 13 may be relocated slightly to produce the desired end loads.

Figure 7:
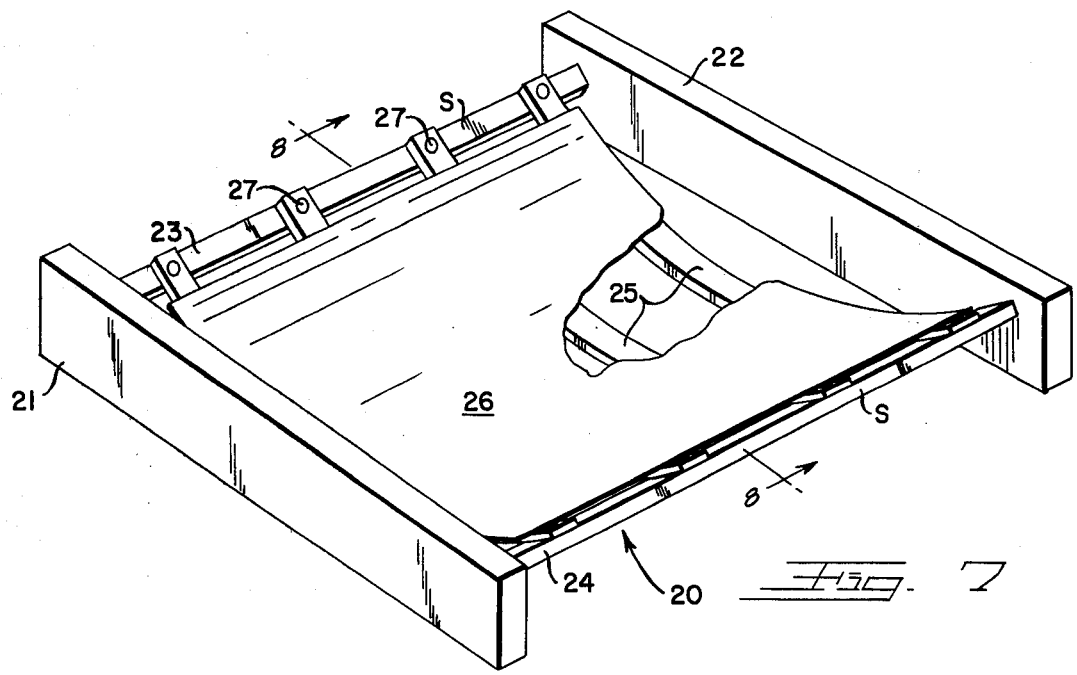
FIG. 7 is a perspective view of a trough reflector structured according to a preferred embodiment of the invention.

The perspective illustration of FIG. 7 shows a cylindrical trough reflector 20 structured in accordance with another preferred embodiment of my invention. As shown, the reflector comprises a pair of spaced frame members 21, 22 which supports a pair of elongated arms 23, 24 therebetween. Arms 23, 24 are spaced apart and extended parallel to one another; each is rigidly connected to the frame members.

Extending between arms 23, 24 in a direction parallel to frame members 21, 22 are a plurality of narrow strips 25 which support a rectangularly-shaped reflective member 26. Preferably, strips 25 are equally spaced from each other, and each is made from a relatively sturdy, yet flexible material. A preferred material is aluminum (⅛ inch thick by 2 inches wide) for a reflector having a 4 to 6 foot cross-sectional width. Each strip is provided at its ends with fasteners 27 for clamping the ends to arms 23, 24 after the strips have been stressed to provide an arcuate shape. For the same reasons as discussed above, the length of strips 25 relative to the spacing between arms 23, 24 and the positions of the aperture (in strips 25 and elongated arms 23, 24) must be accurately determined.

The reflective member 26 is bonded to the upper surfaces of the strips by an adhesive, for example. As in the FIGS. 4-6 embodiment, the reflective member may comprise, for example, a thin (e.g. 30 mils thick) sheet of aluminum having a polished upper surface. The reflective member may, of course, be fabricated from other materials; however, the reflective material and the strips should be rigidly attached to one another to maximize the stiffness, and thereby minimize deflections due to wind or gravity.

Figure 8:
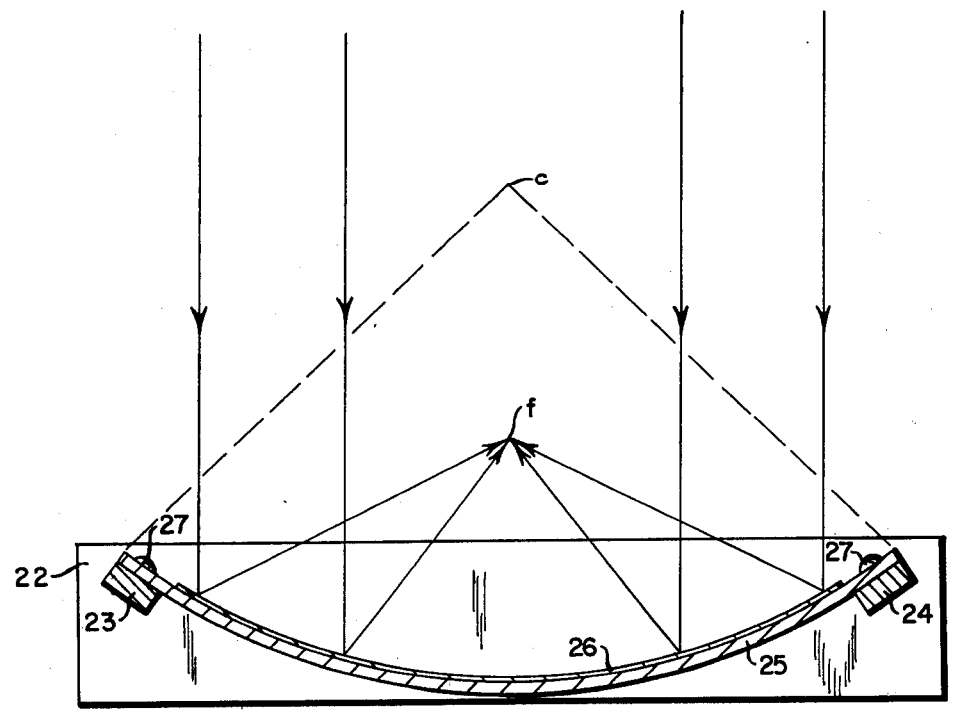
FIG. 8 is a cross-sectional view of the FIG. 7 reflector taken along the section line 8—8.

As best shown in the cross-sectional view of FIG. 8, the surface of each of the reflector's support arms 23, 24 which engages the ends of strips 25 is arranged to be tangent to the radius vectors passing through the center line of curvature C of the desired cylindrical sector shape. The line of focus f of the reflector is, of course, half the distance between the reflective surface of member 26 and the center line of curvature C.

To produce a desired cylindrical sector shape, it is necessary to create a uniform, substantially pure, bending moment in each of strips 25 throughout the portion which supports the reflective member. Further, it is necessary to produce such moments without exceeding the elastic limits of the strips. Having once produced this condition, it is, of course, necessary to maintain this condition; otherwise, the strips and the reflective member will relax to form a planar shape. To maintain the uniform bending moment once achieved (e.g. by manually flexing strips 25), each strip is provided with a precisely positioned aperture in its respective ends through which the strips can be bolted, or otherwise fastened to surfaces S of support arms 23, 24. The fasteners must also be precisely sized. Such precision assures that once strips 25 (and the reflective member) are fastened to support arms 23, 24 and released, there are no tensile or compressive stresses in the strips that would tend to press the ends of strips 25 apart, or to urge them together. In fact, after the fasteners are in place, thereby producing a pure bending moment uniformly throughout strips 25, there will be no forces exerted on the ends of the strips which would tend to alter the resulting cylindrical sector configuration. The only tensile or compressive forces which can be tolerated are those stresses which may be incorporated by design to modify the cylindrical shape toward that of the optimum parabolic shape. These additional forces would never exceed 10-15 percent of the maximum stresses due to the pure bending moment.

Figure 9:
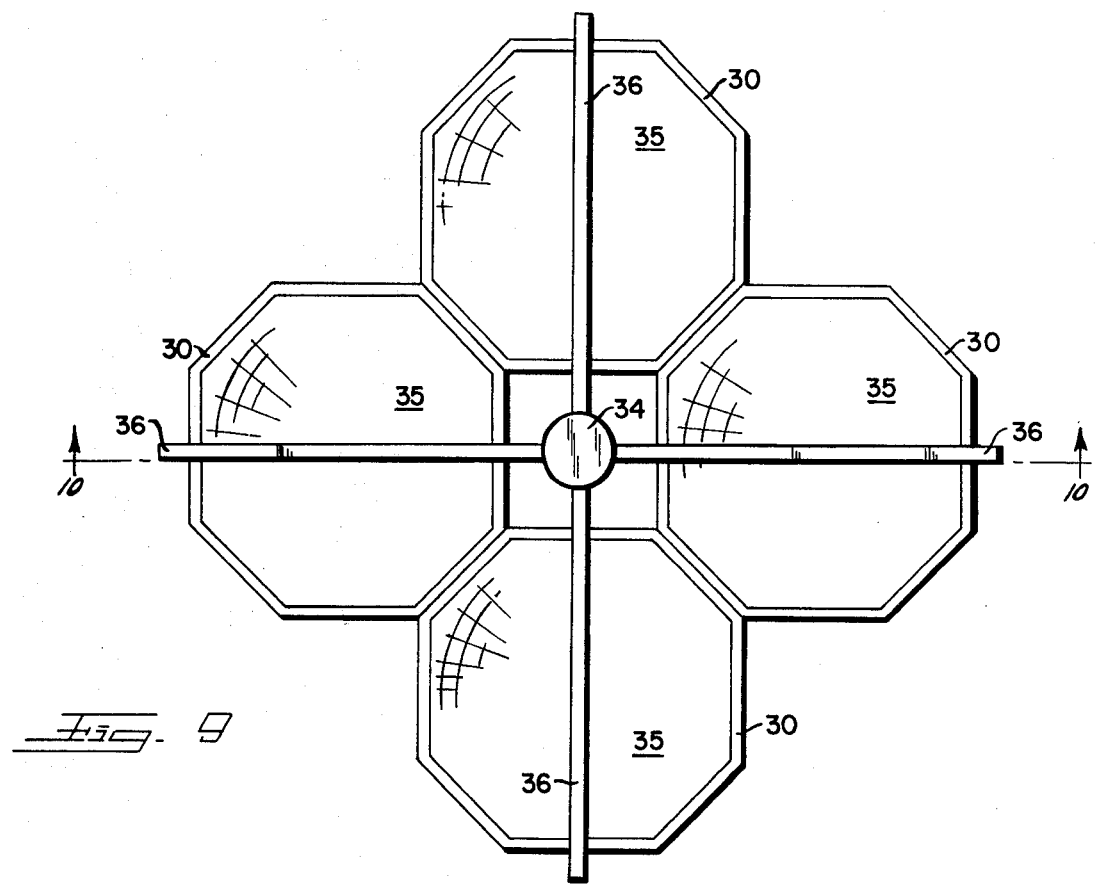
FIGS. 9 and 10 illustrate an alternate embodiment of the invention.
Figure 10:
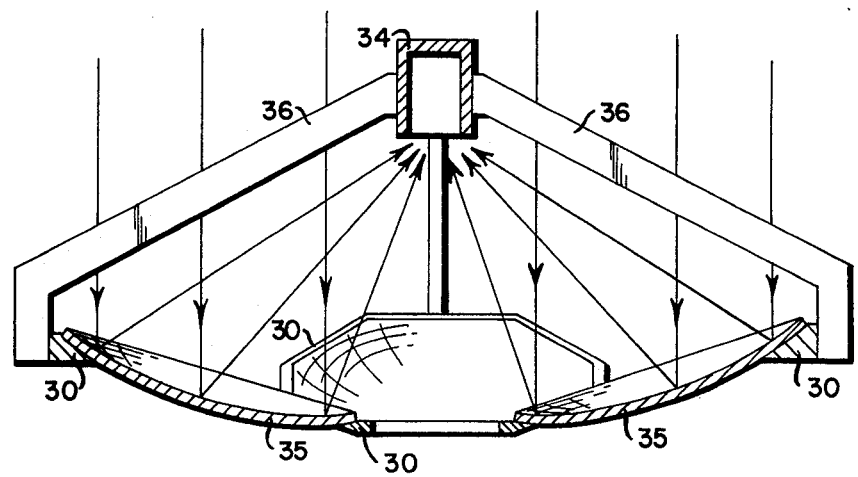

FIGS. 9 and 10 show still another embodiment of the invention, this embodiment being particularly useful for space applications. In this embodiment, the annular frame of the FIG. 2 embodiment is in the form of an octagonal frame 30, and four such frames are arranged in a square pattern about a central receiver (34). Of course, other frame configurations are possible. The reflective members 35 (also octagonal in shape) are clamped to the inclined surfaces of the rings to create the twisting moments in the reflective sheet. Since gravity sag and wind loads are not present, stiffeners, such as the substructures shown in FIGS. 4 and 7, are not required. The frames are inclined toward the center to direct the focused energy onto the receiver 34. The receiver is shown as a cavity thermal-fluid type supported by struts 36.

From the foregoing, it can be appreciated that the reflectors of the invention lend themselves to large scale fabrication. For example, dish reflectors having diameters in excess of twenty feet can be easily fabricated by the disclosed technique. Similarly, trough reflectors of comparable size can also be produced by this technique.

The invention has been disclosed with particular reference to preferred embodiments. Variations and modifications of such embodiments within the scope of the invention will undoubtedly suggest themselves to those skilled in the art. The foregoing description should therefore be taken as illustrative and not in a limiting sense.

I claim:

1. A reflector comprising a flexible planar member having a reflective surface and a substantially circular shape, and means for engaging said planar member, after said member has been flexed within its elastic limits to assume an arcuate shape having a desired radius of curvature, at various locations along the periphery thereof and for maintaining said planar member in its flexed state, said engaging and maintaining means comprising a substantially rigid and circular frame having inclined surfaces and a diameter less than the diameter of said planar member when said planar member is unflexed, and means for clamping portions of said planar member, adjacent the edges thereof, to said inclined surfaces on the frame, said inclined surfaces being tangent to said arcuate shape.

2. A dish-shaped reflector comprising a circular frame, a circular, flexible planar member having a reflective surface, the diameter of said frame beng less than the diameter of said planar member when said planar member is unflexed, and means mounted on said frame for grasping said planar member, after said member has been flexed within its elastic limits to assume a spherical shape, and for preventing said member from relaxing to an unflexed state.

3. A reflector comprising a flexible planar member having a reflective surface, a plurality of flexible strip members operatively coupled to said planar member, and means for engaging opposite ends of said flexible strip members to produce a substantially uniform bending moment, (after said assembly has been initially deflected for engagement by external forces) so as to cause said assembly to flex to a circular sector shape, and for maintaining said assembly in said circular sector shape after said external forces have been removed.

4. A trough reflector comprising a flexible planar member having a reflective surface and means for producing a pure bending moment in said planar member, whereby said member assumes a substantially cylindrical sector shape, said producing means comprising a frame and pair of spaced supports fixedly mounted on said frame for engaging opposing edges of said planar member after external forces have been applied to said planar member to flex said member to a substantially cylindrical sector shape, and for exerting pure bending moments on said planar member after said external forces have been removed.

5. A dish reflector comprising a flexible planar member having a reflective surface, a network of flexible strip members operatively coupled to said planar member, and means for engaging outside ends of the strip members to produce a uniform bending moment in said strip members after said strip members have been deflected by external forces, said uniform bending moment causing said planar member to assume a substantial spherical shape.

* * * * *